US008855361B2

(12) United States Patent
Millar et al.

(10) Patent No.: US 8,855,361 B2
(45) Date of Patent: Oct. 7, 2014

(54) SCENE ACTIVITY ANALYSIS USING STATISTICAL AND SEMANTIC FEATURES LEARNT FROM OBJECT TRAJECTORY DATA

(75) Inventors: Greg Millar, Coarsegold, CA (US); Farzin Aghdasi, Clovis, CA (US); Hongwei Zhu, Fresno, CA (US)

(73) Assignee: Pelco, Inc., Clovis, CA (US)

( * ) Notice: Subject to any disclaimer, the term of this patent is extended or adjusted under 35 U.S.C. 154(b) by 344 days.

(21) Appl. No.: 12/981,952

(22) Filed: Dec. 30, 2010

(65) Prior Publication Data

US 2012/0170802 A1 Jul. 5, 2012

(51) Int. Cl.
*G06K 9/00* (2006.01)
(52) U.S. Cl.
CPC .................................. *G06K 9/00785* (2013.01)
USPC ............ 382/103; 382/104; 382/106; 382/107
(58) Field of Classification Search
USPC ........................... 382/103, 104, 106–107, 224
See application file for complete search history.

(56) References Cited

U.S. PATENT DOCUMENTS

| 8,300,892 | B2 * | 10/2012 | Iwasaki et al. ................. 382/103 |
| 2008/0193010 | A1 | 8/2008 | Eaton et al. |
| 2009/0016599 | A1 * | 1/2009 | Eaton et al. ................... 382/159 |
| 2009/0016600 | A1 | 1/2009 | Eaton et al. |
| 2009/0192990 | A1 | 7/2009 | Chin et al. |
| 2010/0166325 | A1 | 7/2010 | Sengamedu et al. |
| 2010/0177969 | A1 | 7/2010 | Huang et al. |
| 2010/0207762 | A1 * | 8/2010 | Lee et al. ....................... 340/541 |
| 2011/0222727 | A1 * | 9/2011 | Sharma ........................ 382/103 |

FOREIGN PATENT DOCUMENTS

WO WO 2009112790 A1 * 9/2009 ................ G06T 7/20

OTHER PUBLICATIONS (Related Matter) International Search Report and Written Opinion; PCT/US2011/067732; Aug. 9, 2012.
International Search Report and Written Opinion; PCT/US2011/066962; Sep. 25, 2012.
Zhang, T. et al. 'Learning semantic scene models by object classification and trajectory clustering' In: Computer Vision and Pattern Recognition, 2009. CVPR 2009. IEEE Conference on. IEEE, Jun. 20-25, 2009. pp. 1940-1947.
Zhou, H. et al. 'Metadata extraction and organization for intelligent video surveillance system' In: Mechatronics and Automation (ICMA), 2010 International Conference on. IEEE, Aug. 4-7, 2010, pp. 489-494.
Lee, M. W. et al, 'SAVE: A framework for semantic annotation of visual events' In: Computer Vision and Pattern Recognition Workshops, 2008. CVPRW '08. IEEE Computer Society Conference on. IEEE, Jun. 23-28, 2008, pp. 1-8.

* cited by examiner

*Primary Examiner* — Matthew Bella
*Assistant Examiner* — Weiwen Yang
(74) *Attorney, Agent, or Firm* — Hunter Clark PLLC

(57) ABSTRACT

Trajectory information of objects appearing in a scene can be used to cluster trajectories into groups of trajectories according to each trajectory's relative distance between each other for scene activity analysis. By doing so, a database of trajectory data can be maintained that includes the trajectories to be clustered into trajectory groups. This database can be used to train a clustering system, and with extracted statistical features of resultant trajectory groups a new trajectory can be analyzed to determine whether the new trajectory is normal or abnormal. Embodiments described herein, can be used to determine whether a video scene is normal or abnormal. In the event that the new trajectory is identified as normal the new trajectory can be annotated with the extracted semantic data. In the event that the new trajectory is determined to be abnormal a user can be notified that an abnormal behavior has occurred.

23 Claims, 11 Drawing Sheets
(2 of 11 Drawing Sheet(s) Filed in Color)

SCENE ACTIVITY ANALYSIS USING STATISTICAL AND SEMANTIC FEATURES LEARNT FROM OBJECT TRAJECTORY DATA

BACKGROUND

Increasingly, many aspects of our lives are monitored and recorded. For example, video surveillance is prevalent, recording scenes for news, general information, and security purposes. Security cameras record visual information of desired locations such as banks, storefronts, automatic teller machines, businesses, roadways, parks, etc.

Typical scene activity analysis methods require operators to specify the events of interest using details such as location, time and event types. Not only is this laborious in case of a large number of surveillance cameras, but also it may lose important events that were never discovered before.

BRIEF SUMMARY

A method for providing scene activity analysis and/or trajectory information summarization about a video scene is disclosed according to some embodiments of the invention. Such a method can include obtaining video scene metadata that includes information regarding trajectories for a plurality of objects moving through the video scene. Each of the plurality of trajectories can be clustered into trajectory groups according to their relative distance from each other and each trajectory in the plurality of trajectories can be classified as a normal trajectory or an abnormal trajectory based at least in part on the clustering. Statistical features can be extracted about trajectory groups, and they can be used to classify a trajectory as a normal or an abnormal trajectory. Semantic data can be extracted for each trajectory group or for each normal trajectory, and each normal trajectory can be annotated with the semantic data, for example, in metadata.

In some embodiments, the clustering can include a number of clustering iterations using a plurality of different distance measures. In some embodiments, the distance measure can include a minimum distance between trajectories, a maximum distance between trajectories, or an average distance between trajectories. In some embodiments, statistical features of a trajectory group can include: average and standard deviation of object height, object width, object size, object speed, object appearance color, object shape, trajectory length, trajectory duration, moving direction probability, spatial occurrence probability, temporal occurrence probability, to name a few. Similarities between statistical features can be used for clustering. That is, trajectories with similar statistical features can be clustered together. In some embodiments, the semantic data includes entry zones, exit zones, representative trajectories, pivotal points and directions of trajectory patterns, and/or crossing zones between different trajectory patterns. In some embodiments, a normal trajectory can be a trajectory with statistical features similar to other trajectories within a group. In some embodiments, an abnormal trajectory is a trajectory that is unassociated with any group of trajectories.

A computer program product residing on a non-transitory processor-readable medium for providing trajectory information about a video scene is also disclosed. The computer readable medium includes instructions to: cluster each of a number of trajectories into trajectory groups according to their relative distance from each other; classify each trajectory as a normal trajectory or an abnormal trajectory based at least in part on the clustering; extract semantic data from each trajectory group or each normal trajectory; and annotate each normal trajectory with the semantic data. In some embodiments, the instructions can cause the processor to cluster each of plurality of trajectories into trajectory groups comprise instructions configured to cause the processor to iteratively cluster the plurality of trajectories using different distance measures. In some embodiments, in the event a trajectory is classified as a normal trajectory further comprising annotating a normal trajectory based on the trajectories association with a classified group of trajectories.

A trajectory analysis system that includes an input, memory and a processor is also disclosed. The input can be configured to receive video scene metadata that includes information regarding the trajectories of objects as the objects move within the video scene. The processing unit can be communicatively coupled to the input and the memory. And the processor can be configured to cluster each trajectory into a trajectory group according to the trajectory's relative distance from previously analyzed trajectories; identify each trajectory as a normal trajectory or an abnormal trajectory based at least in part on the clustering; and annotate each normal trajectory as a normal trajectory or an abnormal trajectory.

In some embodiments, the processing unit can be configured to extract semantic data from each trajectory group or each normal trajectory and annotate the normal trajectory with the semantic data. The trajectory analysis system can also include a user interface and the processing unit is configured to notify the user through the user interface in the event a trajectory is an abnormal trajectory. The trajectory analysis system can also include a camera.

A method for determining abnormal behavior in a video scene is also provided. The method can include creating a database of normal trajectories from video data of a scene that includes a plurality of objects moving through the scene along a trajectory; identify a new trajectory within the video scene; determine whether the new trajectory is a normal trajectory; and in the event the new trajectory is not a normal trajectory, notifying a user. A normal trajectory comprises a trajectory that is clustered with a plurality of previous trajectories within the video scene. In some embodiments, a normal trajectory comprises a trajectory whose distance is near a plurality of previous trajectories within a group in terms of statistical feature similarities.

In some embodiments, the creating a database of normal trajectories can include clustering each trajectory into a trajectory group according to its relative distance from other trajectories; classifying each trajectory as a normal trajectory or an abnormal trajectory based at least in part on the clustering; and saving the results of the classification in a database. In some embodiments, the determining whether the new trajectory is a normal trajectory comprises determining the relative distance in terms of statistical feature similarities between the new trajectory and one or more of the normal trajectories stored within the database.

A trajectory analysis system is also provided that includes an input, a user interface, memory, and a processing unit. The input can be configured to receive video scene metadata that includes information regarding the trajectories of objects as the objects move within the video scene. The memory can be configured to store normal trajectories from video data of a scene that includes a plurality of objects moving through the scene along a trajectory, wherein a normal trajectory comprises a trajectory that is clustered with a plurality of previous trajectories within the video scene. The processing unit can be communicatively coupled to the input and the memory. And the processing unit can be configured to: identify a new trajectory within the video scene; determine whether the new trajectory is a normal trajectory; and in the event the new trajectory is not a normal trajectory, notify a user through the user interface.

According to some embodiments, a normal trajectory is identified as a normal trajectory when the new trajectory is near a plurality of previous trajectories in terms of a statistical feature derived score. In some embodiments, the new trajectory is identified as being near another trajectory based on the relative distance from the new trajectory and the plurality of trajectories. The relative distance can be a minimum distance between trajectories, a maximum distance between trajectories, and/or an average distance between trajectories. In some embodiments, the new trajectory is identified as being near another trajectory not only based on the relative distance from the new trajectory and the plurality of trajectories, but also taking into account their similarity in moving direction, speed, or appearing time, etc.

In some embodiments of the invention trajectory information can be used to cluster trajectories into groups of trajectories according to each trajectory's relative distance between each other. By doing so, a database of trajectory data can be maintained that includes the trajectories organized into trajectory groups. This database can be used to train a system to identify a trajectory or a group of trajectories as normal and/or abnormal. From this information a new trajectory can be analyzed to determine whether the new trajectory is normal or abnormal. Embodiments described herein, can be used to determine whether a video scene is normal or abnormal. In the event that the new trajectory is determined to be abnormal a user can be notified that an abnormal behavior has occurred.

Items and/or techniques described herein may provide one or more of the following capabilities, and/or other capabilities not mentioned. Items of greater interest in a captured image, e.g., of a video, can be displayed with higher resolution than items of lesser interest. The items of greater interest and the items of lesser interest can be displayed on different displays, or in a single display. A viewer can see items of interest in a display more clearly than other items. Moving objects can be tracked and displayed with higher resolution than stationary or relatively stationary objects. Objects can be displayed with higher resolution in a portion of a display that facilitates viewing with high-resolution portions of a person's eye. Further, it may be possible for an effect noted above to be achieved by means other than that noted, and a noted item/technique may not necessarily yield the noted effect.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Techniques for analyzing scene activity are disclosed. In some embodiments, techniques can automatically learn normal behaviors of an object moving within in a scene (field of view), and extracts their statistical and semantic features. The learned features can be utilized to identify anomalies while analyzing normal scene behaviors. Using these techniques, there is no need for operators to have prior knowledge about a scene and set event rules as most of current video analytic systems do.

One objective of activity summarization is to discover the essential patterns of objects' behaviors in a semantically meaningful manner. In some techniques, this can be done by analyzing the trajectory data of moving objects resulted from video analytics algorithm about what, where, when and how the objects appear in the scene. Semantic information can benefit the analysis of objects' activities occurring in a scene in different ways, from low level object detection, to middle level event detection, and to high level activity understanding and abstraction, forensic search, etc. The semantic representation of scene activities can be learned through a data driven clustering method automatically or with minor human interactions if required.

Given a set of objects' trajectories in terms of their objects, in some embodiments, trajectories can be grouped according to selected features such as spatial location and form clusters, and then apply the resultant clusters to model their common properties in terms of statistical features and semantic features. With learned statistical features, an object's behavior can be classified into either normal or abnormal activity, and a normal activity can be further annotated by using the semantic features of its belonged cluster.

When an object moves from one position to another position within a camera scene, the objects visual representation can be represented by a trajectory. A trajectory includes a sequence of spatial locations in terms of image pixel coordinates visited by the object in order of occurrence. A trajectory can be modeled as $$T_o = \{(x_i^o, y_i^o, f_i^o) | i = i_s^o, \ldots, i_e^o\}$$

where $(x_i^o, y_i^o)$ denotes the coordinates in the 2D image of the monitored scene of object, o, and $f_i^o$ denotes a feature of the object at discrete time i, which can range from the object's start time $t_s^o$ to the object's disappearing time $t_e^o$. For convenience, it can be simplified as the index number of corresponding observation of trajectory $T_o$, specifically 1 corresponding to the first observation at the starting time, and 2 corresponding to the second, and so on. Thus, the trajectory with m observations of object o can be represented as $$T_o = \{(x_i^o, y_i^o, f_i^o) | i = 1, \ldots, m\}.$$

Object feature $f_i^o$ may represent a set of features including object moving direction, speed, appearance, object width, object height, etc.

Figure 1:
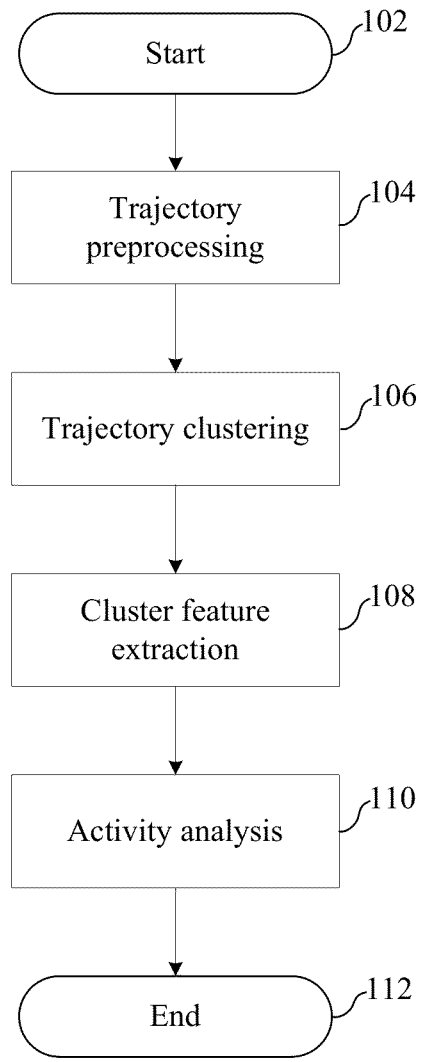
FIG. 1 is a flowchart of an activity summarization process.

Referring to FIG. 1 process 100 for making scene activity summarization and analysis starts at block 102 and includes four generalized blocks. These blocks include trajectory pre-processing 104, normal trajectory clustering 106, cluster feature extraction 108, and activity analysis 110. Process 100 then ends at block 112. Process 100 is, however, an example only and is not limiting. Process 100 can be altered, e.g., by having blocks added, removed, rearranged, combined, and/or performed concurrently.

Figure 2:
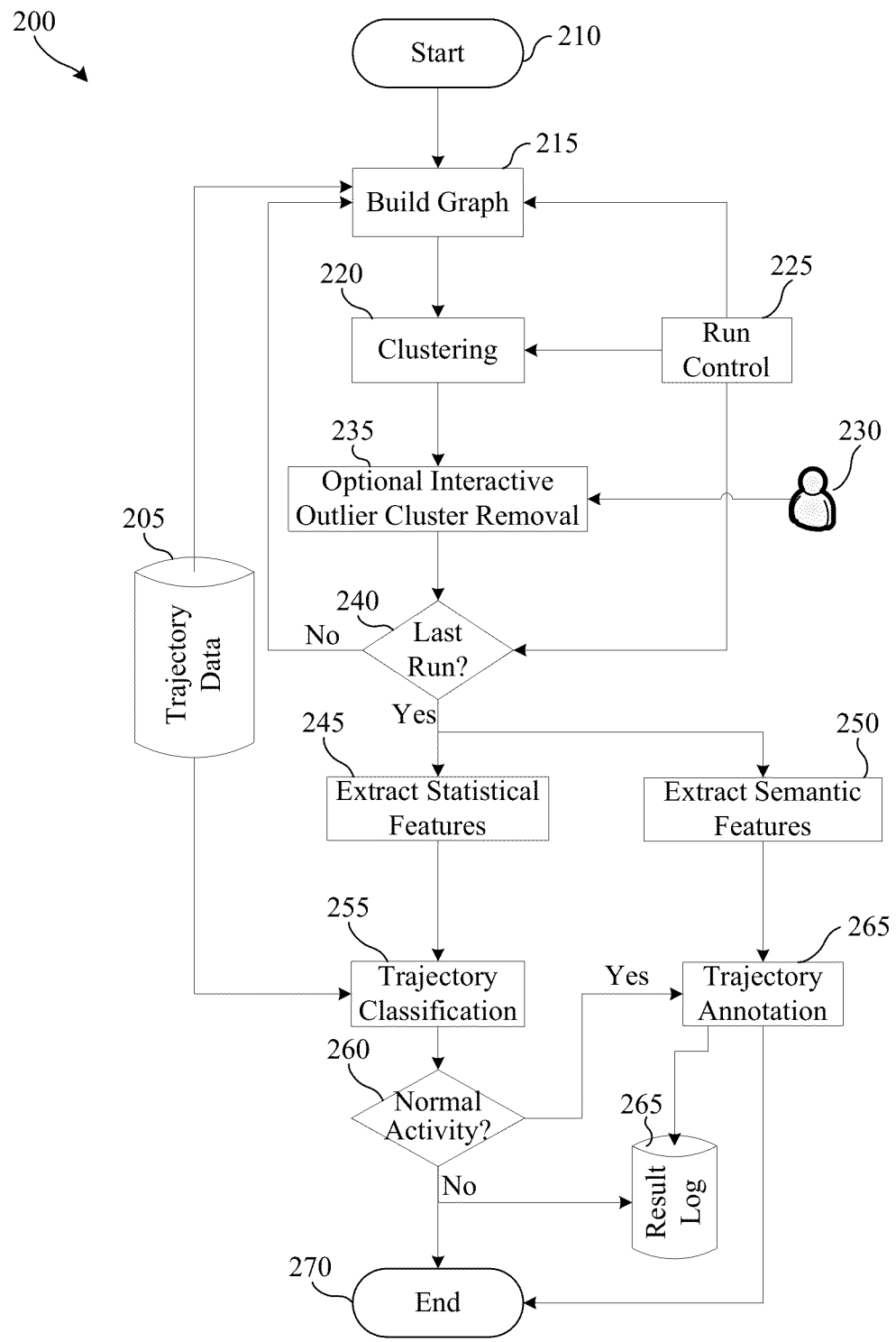
FIG. 2 is a more detailed flowchart of an activity summarization process.

Referring to FIG. 2 process 200 is a more detailed process for scene activity summarization and analysis that includes the shown blocks. Process 200 is, however, an example only and is not limiting. Process 200 can be altered, e.g., by having blocks added, removed, rearranged, combined, and/or performed concurrently. Video analytics of recorded video scenes can be conducted and the various trajectories of objects within the scenes can be stored in trajectory database 205. These trajectories can be used throughout process 200. Various techniques can be used to produce the trajectory data. Moreover, the trajectory information can be stored as metadata either in conjunction with the video scene or separate therefrom. Process 200 starts at block 210. At block 215 the trajectory data is used to generate a graph representation of the trajectory data with each node presenting a trajectory and an edge indicating the distance between its two connected nodes (e.g., spatial distance between the two trajectories). At block 220 trajectories can be clustered using a graph partitioning algorithm to split the graph into sub-graphs. For example, the sub-graphs can be made such that nodes within a sub-graph include the nearest neighbors of a seed trajectory that fall into an expected distance range of the seed trajectory according to the statistics of their distributions. Clusters of trajectories are automatically formed based on distance and require no prior knowledge about the number of clusters. The resultant clusters can vary and reflect different natures based on the distance measure used to cluster the graph. Thus, with the same graph based clustering algorithm, different clustering results can be achieved to produce different target goals. This can be done, for example, at run control block 225.

In some embodiments, three clustering runs can occur. Each of these can involve different parameters related to the definition of distance matrices of graph edges, cluster statistics updating scheme, and/or the handling of leftover trajectories (trajectories that do not belong to any clusters). Runs 1 and 2, for example, can be designed for trajectory selection in the preprocessing stage. Run 3, for example, can be designed for normal trajectories clustering. Each run, for example, can cluster trajectories using a different distance measure. Turning first to run 1. This run can adopt a strict distance measure to group spatially close trajectories seriously and form clusters based on operator input from block 230. For example, run 1 can use the maximum distance between trajectories as the clustering measure. As another example, run 1 can use the mathematical function termed Distance 1, defined below, as the clustering measure. Operator input from block 230 can determine if a cluster and the related constituent trajectories need to be removed at block 235. In some embodiments, run 1 can be skipped, and all collected trajectories can undergo run 2. This can depend on whether operator input is desired.

Run 2 can be similar to run 1, but with a less strict distance measure. In some embodiments, run 2 can cluster trajectories based on the minimum distance between trajectories. As another example, run 2 can use the mathematical function termed Distance 2, defined below, as the clustering measure. The results from run 2 can produce clusters that have more compatibility among trajectories. For example, if there are two trajectories such that one of which is part of the other, run 2 can determine that the two runs are very close with each other.

Trajectories passing through run 1 and run 2 are fed into run 3 for further clustering. A third distance measure is defined during run 3 that calculates the average distance of trajectories. This is different than run 1 that uses the maximum distance between trajectories and run 2 that uses the minimum distance between trajectories. Normal activity clusters are formed that indicate a typical pattern of objects' trajectories in the monitored scene. As another example, run 3 can use the mathematical function termed Distance 3, defined below, as the clustering measure.

Block 240 can determine if all runs (e.g., all three runs, if all three runs are used) have been completed. If so, statistical features about each cluster of trajectories can be extracted at block 245. These statistical features can include, for example, average and standard deviation of object and trajectory features (e.g., object height, object width, object size, object speed, object appearance, object color, object shape, trajectory length, trajectory duration), direction probability, spatial occurrence probability, temporal occurrence probability, etc. And at block 250, semantic features can be extracted. These semantic features can include, for example, representative trajectories, entry zones, exit zones, crossing zones between different trajectory patterns, pivotal points and directions of trajectory patterns, etc.

At block 255 each trajectory can be classified as normal activity associated with a resulted cluster or an abnormal activity that does not belong to any clusters. This classification, for example, can use the statistical features extracted at block 245. In some embodiments, the identification of a trajectory as an outlier may be a cause for concern. For instance, in secure locations such as airports or military bases, abnormal behavior can be related with an abnormal trajectory. As such, a video camera can record scenes from such locations and the embodiments described herein can classify an activity as an abnormal activity. If such an activity is found, the authorities may be alerted, for example, by sounding an alarm, or the like. If it is determined, at block 260, that a trajectory includes normal activity, then the trajectory can be annotated using semantic features at block 265. Regardless of the determination made at block 260, the results can be logged into a data storage 265 and process 200 can end at block 270.

In some embodiments, trajectories of different objects can be grouped using a distance measure as a clustering criterion. For example, the spatial distance between a pair of trajectories can be used. Depending on the target objective, a distance measure can be defined for the discrete representation of a trajectory.

Assume the training data set has t trajectories, denoted by $T=\{T_o|o=1,\ldots,t\}$. Let $d_{ab}=d(T_a, T_b)$ be the distance between $T_a$ and $T_b$. The training trajectory data set can be represented as an undirected graph, $G=(T, E)$ where T is the set of trajectory nodes with node o representing $T_o$ and E is a set of edges with the edge $E_{ab}$ linking node a and node b and its weight $d_{ab}$ representing the distance of the two connected nodes.

With training trajectory data available, the distances can be represented in a graphical form. An example of a five-node graph is provided in FIG. 3A that corresponds to the five sample trajectories in FIG. 3B. When clustering them as groups according to their spatial proximity, it is reasonable to separate them into two groups by observing FIG. 3B. This can also be accomplished by partitioning the equivalent graph in FIG. 3A, where $T_1$, $T_2$ and $T_3$ are near together and can form a group while $T_4$ and $T_5$ are near together and can form the other group since each group has small intra distance among its constituent trajectory nodes while the inter distance between the two groups are large. With a large number of training trajectories, it can be challenging to place graphs into sub-graphs.

Different trajectories may have different number of observations, and measuring the distance of a pair of them can be done by normalizing them first into a unified length, i.e., having a same number of observations via such techniques as sampling or interpolation, and then applying a traditional distance metric to calculate the distance. An alternative way is to adopt metrics that can calculate the distance between two different-size sets of points, such as Hausdorff distance. As noted above, three different clustering runs were described in relation to FIG. 2, where each run used a different distance to achieve different goals. Given two trajectories, $T_a=\{(x_i^a, y_i^a, f_i^a)|i=0, \ldots, m\}$ for object a and $T_b=\{(x_j^b, y_j^b, f_j^b)|j=0, \ldots, n\}$ for object b, three distance metrics are defined below:

Distance 1: $d_{ab}^{max}=\max(d(T_a,T_b), d(T_b,T_a))$, where $$d(T_a, T_b) = \max_{i \in \{1,\ldots,m\}} \left( \min_{j \in \{1,\ldots,n\}} (\|(x_i^a - x_j^b), (y_i^a - y_j^b)\|) \right)$$

is the directed distance from $T_a$ to $T_b$ and $\|(x_i^a-x_j^b),(y_i^a-y_j^b)\|$ may take either city block distance or Euclidean distance between points $(x_i^a,y_i^a)$ and $(x_j^b,y_j^b)$. Similarly $d(T_b, T_a)$ is the directed distance from $T_b$ to $T_a$. The basic concept behind the directed distance metric $d(T_a, T_b)$ is that for each of observations of $T_a$, find the minimum of all its distances to every observation of $T_b$ and then take the maximum as the directed distance from $T_a$ to $T_b$. Finally, $d_{ab}^{max}$ takes the larger one of $d(T_a, T_b)$ and $d(T_b, T_a)$ as the undirected distance of the two considered trajectories.

Distance 2: $d_{ab}^{min}=\min(d(T_a,T_b),d'(T_b,T_a))$, where $d_{ab}^{min}$ takes the smaller one of $d(T_a, T_b)$ and $d(T_b, T_a)$.

Distance 3: $d_{ab}^{avg}=\max(d'(T_a,T_b),d'(T_b,T_a))$, where $$d'(T_a, T_b) = \frac{1}{m}\sum_{i=1}^{m} \min_{j=1}^{n-1} (d(x_i^a, y_i^a, L(x_j^b, y_j^b, x_{j+1}^b, y_{j+1}^b)),$$

and $d(x_i^a,y_i^a,L(x_j^b,y_j^b,x_{j+1}^b,y_{j+1}^b))$ is the perpendicular distance from point $(x_i^a,y_i^a)$ to line segment $L(x_j^b,y_j^b,x_{j+1}^b,y_{j+1}^b)$ connecting $(x_j^b,y_j^b)$ and $(x_{j+1}^b,y_{j+1}^b)$ if the base of the perpendicular dropped from $(x_i^a,y_i^a)$ to $L(x_j^b,y_j^b,x_{j+1}^b,y_{j+1}^b)$ is located within $L(x_j^b,y_j^b,x_{j+1}^b,y_{j+1}^b)$; otherwise, $d(x_i^a,y_i^a,L(x_j^b,y_j^b,x_{j+1}^b,y_{j+1}^b))$ takes the smaller of the two distances from $(x_i^a,y_i^a)$ to $(x_j^b,y_j^b)$ and $(x_{j+1}^b,y_{j+1}^b)$. Different from distance 1, distance 3 first calculates the average of the minimum distance among all the perpendicular distances from every observation of one trajectory to the other trajectory, and then pick the maximum.

In some embodiments, two parameters can be used to control the clustering process: a parameter update-mode and a removal-flag. Parameter update-mode controls how to update the distance statistics of a cluster as a clustering process proceeds, and it can have two options: weighting average and direct arithmetic average. Parameter removal-flag can be used to facilitate the outlier trajectory removal. If the removal-flag is enabled, then when the clustering process is terminated all the remaining un-clustered trajectories are treated as outliers and thus removed. Such trajectories are not considered in further clustering processes. Otherwise, all the remaining un-clustered trajectories are treated as an independent separate cluster and are further processed in next level clustering.

Figure 3A:
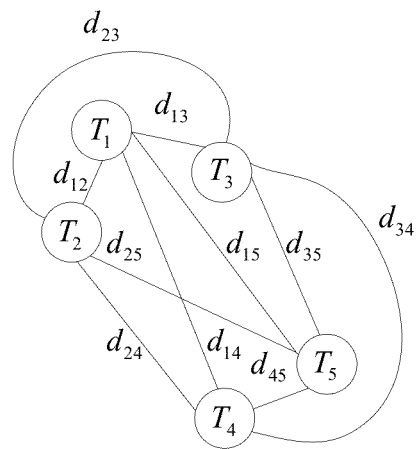
FIG. 3A is a five node graph for various trajectories.
Figure 3B:
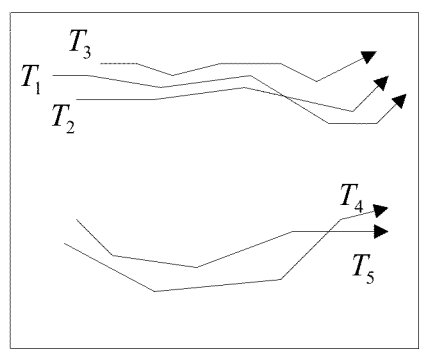
FIG. 3B shows five sample trajectories.
Figure 4:
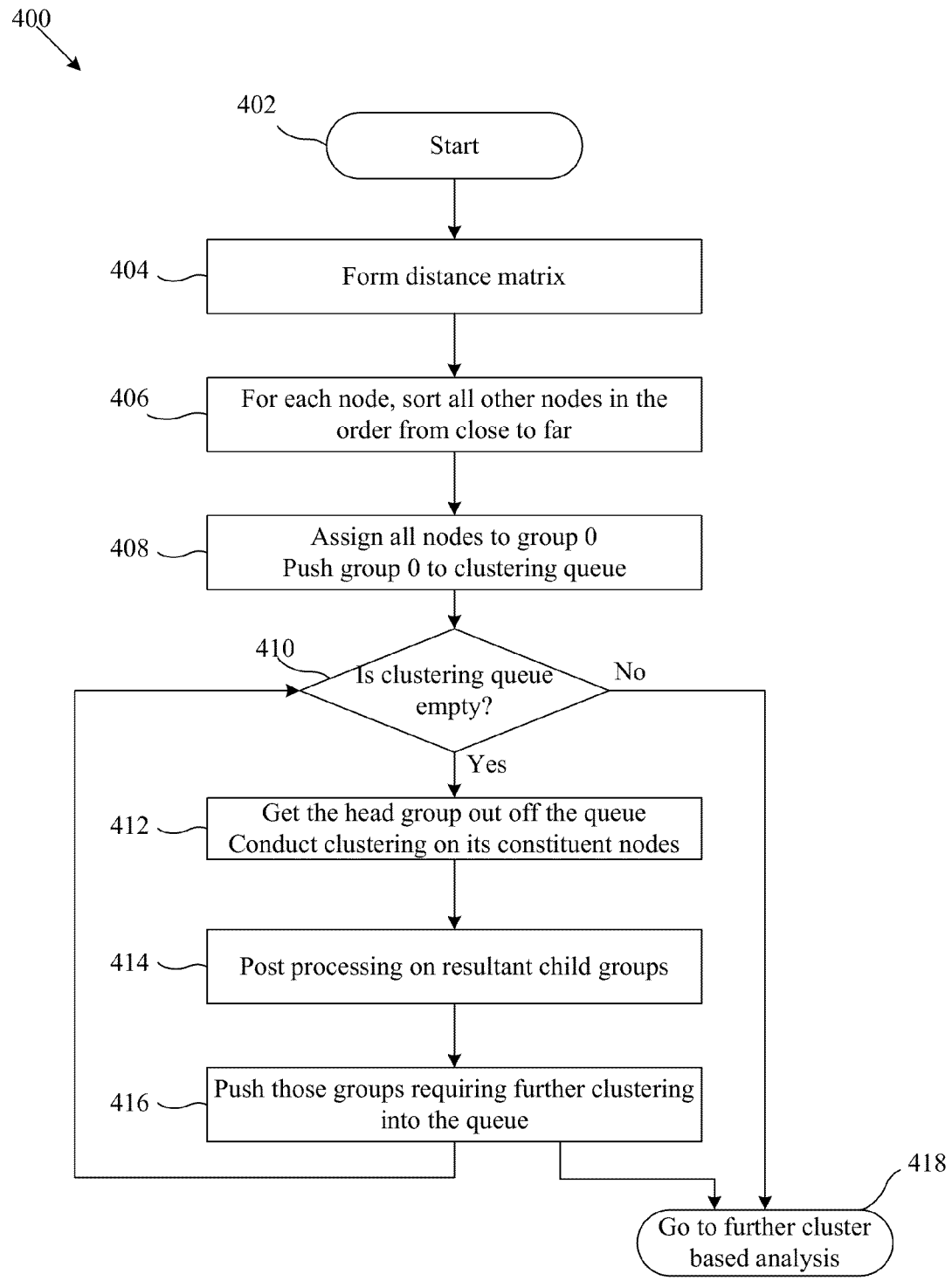
FIG. 4 is a flowchart of a process for clustering trajectories.

Referring to FIG. 4 with further references to FIGS. 1-3, process 400 for clustering trajectories that includes the blocks shown. Process 400 is, however, an example only and is not limiting. Process 400 can be altered, e.g., by having blocks added, removed, rearranged, combined, and/or performed concurrently. Process 400 starts at block 402. At block 404 a distance matrix can be created. The distance matrix can include the weights of the edges in the graph representation shown in FIG. 3A. For example, the distance between each trajectory and every other trajectory can be calculated and placed within the distance matrix. Various techniques are described herein that can be used to calculate the entries in the distance matrix.

At block 406, for each node, sort all other nodes in the order from the nearest to the furthest distance to a given node. At block 408 all nodes can be assigned into one initial group, for example, group 0, and the group can be pushed into the clustering queue. At block 410 the clustering queue is checked to determine whether the clustering queue is empty. If it is, clustering is complete and process 400 proceeds to block 418. If the clustering queue is not empty, then the head group of nodes is pulled from the queue a clustering is performed over the nodes within this group at block 412. At block 414, post process can be performed on the resultant groups. Groups that require further processing are pushed into the clustering queue at block 416.

Post-processing, in block 414, for example, can include three stages. First, both mean and standard derivation of the trajectory lengths of the nodes (each node representing a trajectory) within the group are calculated. Only those nodes which lengths within a certain range (a preset scale times the standard variation of the length) around the mean length are kept and the others that are either too long or too short are considered as outliers and removed from this group. Second, the group is removed if its number of nodes is less than a preset threshold. Third, determine whether the group requires further clustering. If the mean trajectory length is less than 2 times its length standard derivation, push it into the clustering queue at block 416; otherwise, the group is considered as a final resultant group, and sent to step 418 for cluster based analysis.

Figure 5:
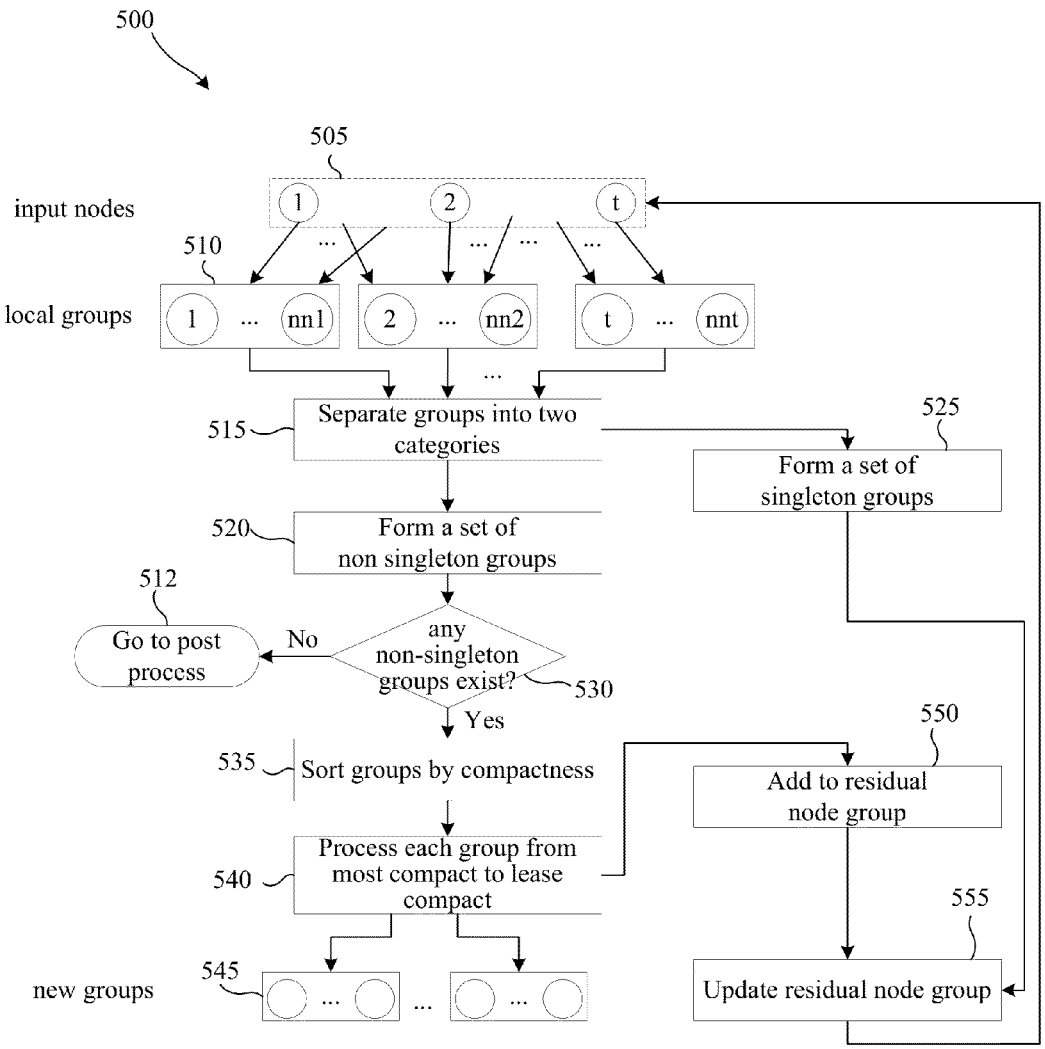
FIG. 5 is a flowchart of a process for clustering nodes within a group through iterative local node grouping.

Referring to FIG. 5, process 500 for clustering nodes within a group through iterative local node grouping includes the blocks shown. Process 500, like all processes described herein, is an example only and is not limiting. Process 500 can be altered, e.g., by having blocks added, removed, rearranged, combined, and/or performed concurrently. For example, process 500 can perform the clustering shown in block 412 of FIG. 4 or block 220 of FIG. 2. In some embodiments, in-group clustering can iteratively form sub-groups of input nodes by gradually merging neighboring nodes that are not yet clustered according to a predefined merging criterion, and then pick the best sub-group as the next new group (cluster) until no further new group can be formed.

Each of the input nodes is treated as a seed trajectory at block 505 (three samples are given as nodes 1, 2 and t). At block 510, the seed trajectories can be centered on which local group is formed by combining the seed's nearest neighbors, for example, using process 600 shown in FIG. 6. As a result, each input node has its own local group (510-1, 510-2, 510t). The quality of the local group can be measured by its compactness, an indicator about how close the nodes inside this group are. The smaller the average distance over all edges (e.g., over all possible pairs of nodes) within the group, the more compact the group is, and better the group's quality.

At block 515, the nodes can be separated into two types of groups: singleton groups and non-singleton groups. If a local group has two or more nodes, it is a non-singleton group, and it is added to the set of non-singleton groups at block 520; otherwise, it is a singleton group and added to the set of singleton groups at block 525. The existence of a singleton group indicates that the related seed node is far away from other nodes in a sense of direct distance. At block 530 the set of non-singleton groups are checked to determine whether any non-singleton groups exist. If so, the nodes from all existing non-singleton groups are sorted in decreasing order of compactness at block 535. This can be done using any type of sorting algorithm. And, at block 540 the nodes are analyzed one by one to determine whether they are a true new group and, if so, they are labeled as such at block 545. A group can be considered a true new group if all its nodes do not belong to any previous new group, or its nodes belonging to previous groups take over the continuous locations at the end of its node index set as determined in process 600 shown in FIG. 6.

After confirming all candidate local groups, for each of those non-singleton groups not accepted, its ungrouped nodes (the nodes not clustered into any new group) are moved into a residual node group at block 550 and the residual node group is updated with the new residual nodes at block 555. The residual node group can include the nodes that are not assigned to any of the new groups. All nodes in the residual node group are then sent back to block 505 for the next iteration of in-group clustering. The process continues until all local groups are singleton groups as identified in block 530, and the iterative clustering process terminates and goes further to the a post process at block 512. The final residual node group and all previously obtained new groups are the final resultant groups, which are further sent to the post process stage.

Figure 6:
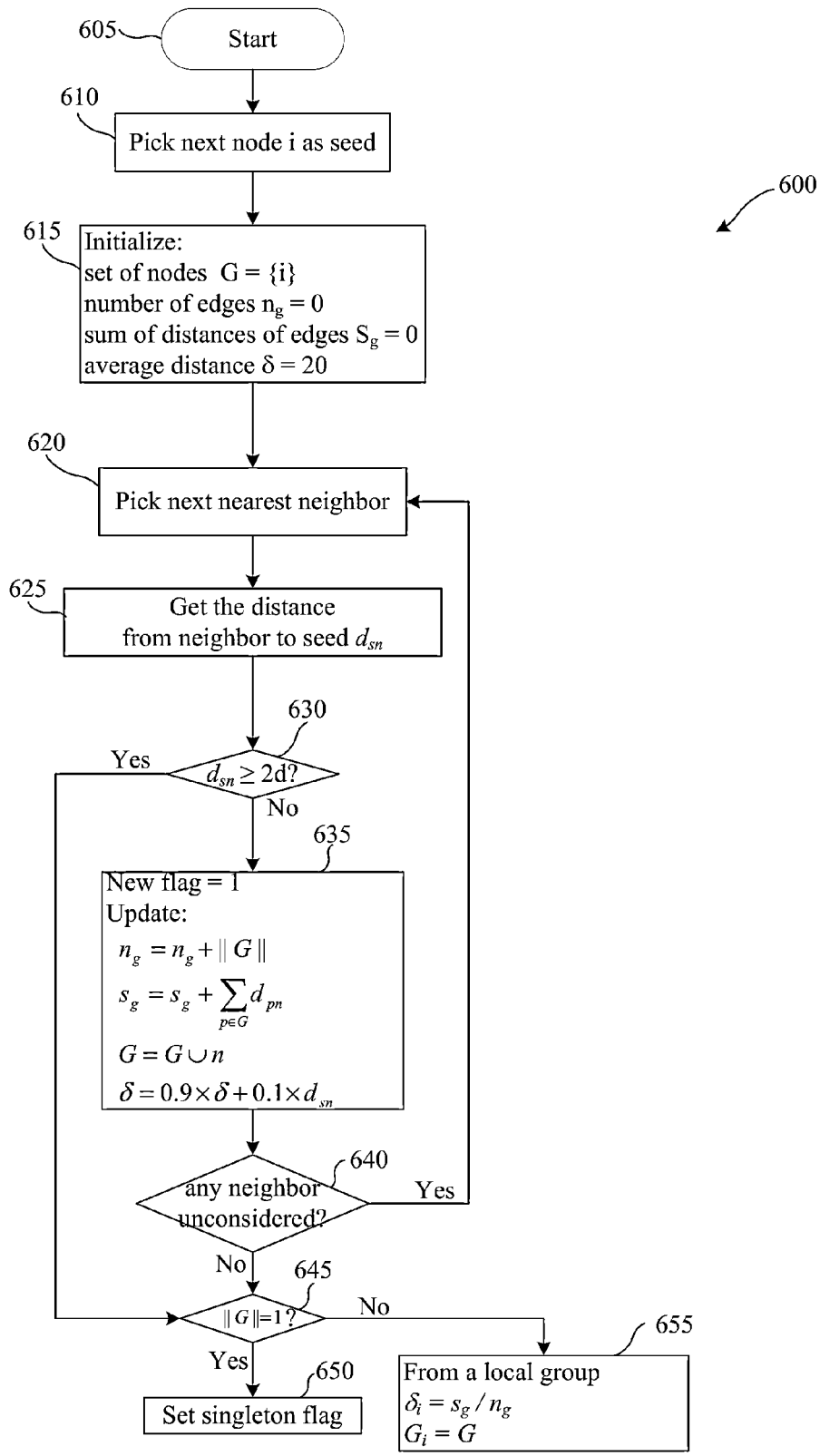
FIG. 6 is a flowchart of a process for constructing a group of nodes centered at a seed

Referring to FIG. 6, process 600 for constructing a group of nodes centered at a seed node includes the blocks shown. The goal of process 600 is to keep the trajectory seed's available nearest neighbors merged into a group until the merging criterion is broken. Process 600 is an example only and is not limiting; it can be altered, e.g., by having blocks added, removed, rearranged, combined, and/or performed concurrently. Process 600 starts at block 605 and at block 610 an input node is picked as a trajectory seed. At block 615 process parameters can be initialized. For example, the following parameters can be set: G the set of nodes in the local group, $n_g$ the number of edges (e.g., the number of pairs of nodes) in group G, $s_g$ the sum of the distances of the edges in group G, and $\delta$ the average distance is set to 20. Although theses initialization values are shown as specific values, these values are used as an example only. Any value can be used for initialization. The next available nearest neighbor n of the seed can be picked at block 620. At block 625, the distance to the seed from the distance matrix can be retrieved.

If the distance is less than 2 times the average $\delta$ as checked in block 630, the four parameters are updated at block 635. Otherwise process 600 proceeds to block 645. For example, the parameters can be updated as follows: the number of edges increases by the number of nodes in G (e.g., the number of new edges that connecting existing nodes in G to the selected neighbor), and the sum of the distances of the edges, $s_g$, increases by the distance of these added edges. Then neighbor n is added to G and the average distance $\delta$ is also updated through a weighting function. After the parameters are updated in block 635, the remaining neighbor nodes are checked at block 640. If any neighbors remain unconsidered then the next run iteration is launched by returning to block 620. Otherwise, no further grouping is required and process 600 proceeds to block 645.

Returning to block 630, if the selected neighbor is at least 2 times of the average distance from the seed, this node is not qualified to be a member of the group centered at the seed. Then process 600 proceeds to block 645. If G has only the seed as checked in step 645, then G is a singleton group and a flag is attached to it in block 650. This flag can be used to block the seed's further grouping in later iterations. If G has two or more nodes, a local group $G_i$ is formed in step 655 and its average over all edges in this local is calculated and saved in $\delta_i$, serving as an indicator of the compactness of $G_i$.

As aforementioned, three runs of clustering process 600 can be employed to learn scene activity patterns. Runs 1 and run 2 are intended for preprocessing to remove outlier trajectories in the training data set and run 3 is the formal process for trajectory pattern discovery. Runs 1 and 2 are not required if the training data set are preprocessed with outlier removal. When runs 1 and 2 are adopted, they are implemented in the same way as the above proposed clustering process, but with minor modifications to speed up the process. For example, in run 1, the distance measure takes distance measure 1, and the weighting average is replaced by direct arithmetic average that is the average over all distances from neighbors to the seed. In run 2, the distance measure takes distance measure 2, and the weighting average is replaced by direct arithmetic average. Run 3 can takes the clustering process 600 with distance measure 3.

In run 1 clustering, the measure of Hausdorff distance measure $d_{ab}^{max}$, distance 1, described above, can be adopted since this measure is prone to exhibit the differences between trajectories. For example, the value of $d_{ab}^{max}$ can be large even if one trajectory is part of the other in their coordinates. By using $d_{ab}^{max}$ trajectories in each resultant cluster are considered similar in a conservative and serious sense. That means, only truly similar trajectories can belong to a same cluster. Human operator can remove the outlier clusters through a user friendly interface. The remaining un-clustered trajectories are not removed unless they are done by human operation. The objective of run 1 clustering is to provide candidate outlier cluster to be removed by human operator while having weird trajectories automatically removed through the post-processing of each child cluster.

In run 2 clustering, the measure of distance 2 $d_{ab}^{min}$, described above, is adopted, which results in clusters that are able to tolerate the difference among trajectories in a group. For example, trajectories assigned into a same cluster may still differ significantly per human judgments. An example of this situation is that two trajectories' distance $d_{ab}^{min}=0$ even if one is part of the other in their observations' coordinates. The objective of run 2 clustering is to have the weird trajectories automatically removed through the post-process of each child cluster.

In run 3 clustering, the measure of distance 3, described, above is adopted. Due to the use of averaging operating in distance 3, this measure takes into account every distance between each observation of one trajectory to the other trajectory. As a result, it could be a true overall indication about the distance between two trajectories. It is not as sensitive as distance 1 does in run 1 clustering, nor is it as tolerant as distance 2 in run 2 clustering.

Figure 7A:
FIG. 7A-7F are scene examples with trajectories superimposed thereon.
Figure 7B:

After clustering, scene activities in the training data set are reduced into a number of groups, each group consisting of the trajectories that are spatially close to each other and forms a specific cluster in terms of its spatial distribution in the scene, for example, a spatial pattern of scene activities. As an example, FIG. 7B shows the color-coded trajectory clusters derived from traffic training trajectory data shown in FIG. 7A. Obviously, the learnt clusters correctly reveal traffic flow patterns that correspond to traffic routes on the site.

Figure 10:
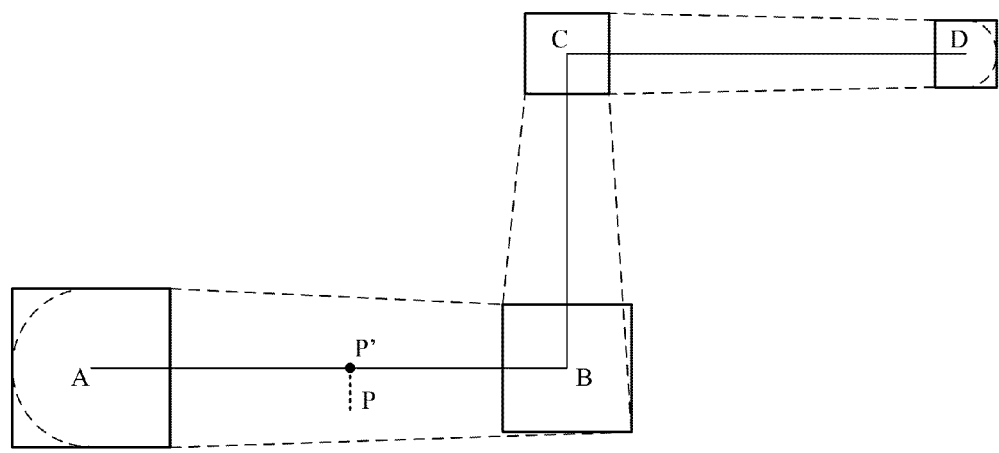
FIG. 10 is a block diagram showing the influential region of various trajectories.

Given a learnt group Gi, the statistical information can be extracted by taking into account all its constituent trajectories over the geometrical locations which are visited. A mechanism is needed to propagate the influence of a trajectory in its surrounding areas so that its features, such as, object width, height, occurrence time, moving direction and speed, for example, the group it belongs to, etc. can be conveyed into its spatial neighboring locations. To this end, an influential region for a trajectory in its surrounding areas can be defined. For example, FIG. 10 presents a trajectory with 4 observations (4 objects denoted by solid squares) at locations A, B, C and D. Its influential region is the inside area bounded by the enclosed dotted line which is centered at the path A→B→C→D of the trajectory, and the boundary is away from the closest location of the path a distance that is a preset proportion (for example, in FIG. 10 it is 0.5) of an interpolated width at the closest location.

To calculate the interpolated width at location P in FIG. 10, first find the base P' of the perpendicular dropped from P to path segment AB; then estimate the object's width at P' using a linear interpolation between the two object widths respectively at A and B. Similarly, an estimate of the height, and time occurrence, etc. can also be made. And, the direction and speed from A to B for an object at location P' can also be used. Further, any feature estimated for P' are conveyed to P as long as this trajectory is concerned, which will be taken into consideration in the calculation of statistical features of the affiliated group. Locations outside the influential region are unaffected by this trajectory.

Figure 7C:
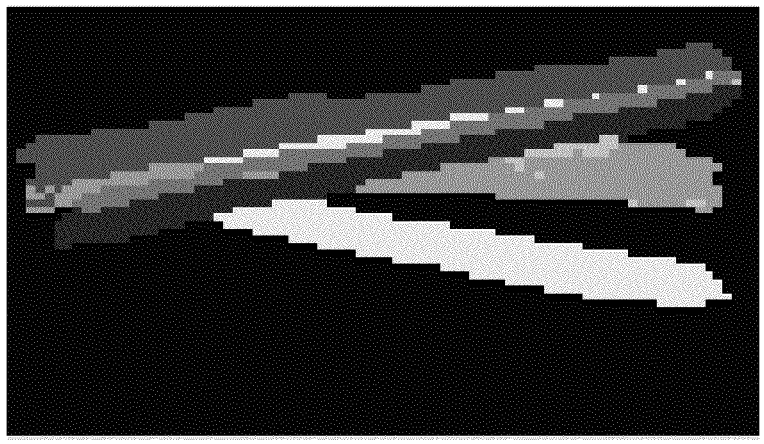

With the concept of influential region, group based features can be thus calculated. Define (x, y) the horizontal and vertical coordinates of a location in the scene, dir moving direction with discrete values from 0 to 8 representing respectively the direction: unknown (a special direction, e.g., keeping stationary, which is none of the following 8 deterministic directions), right move, forward-right move, forward move, forward-left move, left move, back-left move, back move, and back-right move. The following statistical features are defined:

avg_width$_i$ (x, y): group $G_i$'s average object width at location (x, y), which is defined as the average of all estimated widths at location (x, y) overall all constituent trajectories of this group.

std_width$_i$ (x, y): group $G_i$'s standard derivation of object weights at location (x, y), which is defined as the standard derivation of all estimated widths at location (x,y) overall all constituent trajectories of this group.

avg_height$_i$ (x, y): group $G_i$'s average object height of object height at location (x, y), computed in a similar manner as avg_width$_i$ (x, y).

std_height$_i$ (x, y): group $G_i$'s standard derivation of object heights at location (x, y), computed in a similar manner as std_width$_i$ (x, y).

avg_speed$_i$ (dir, x, y): group $G_i$'s average speed in direction dir at location (x, y), computed in a similar manner as avg_width$_i$ (x, y).

std_speed$_i$ (dir, x, y): group $G_i$'s standard derivation of speed in direction dir at location (x, y), computed in a similar manner as std_width$_i$ (x, y).

prob_dir$_i$ (dir, x, y): group $G_i$'s probability of having moving direction dir at location (x, y). For each location, a histogram of 9 bins with each bin corresponding to one of the 9 discrete directions defined above can be set such that it keeps the counts of the moving direction of influential trajectories in group $G_i$ that has this direction, and then the histogram is normalized to make its sum to one.

prob$_i$(x, y): cluster probability of $G_i$ at location (x, y). This probability is 0 if location (x, y) is not within any of the influential region of $G_i$'s constituent trajectories. Otherwise, for each of the resultant groups find its trajectories which influential regions cover location (x, y), and then compute the probability of the group by accumulating that contributed by those influential trajectories through a triangle kernel function (with the highest value 1 on the trajectory and zero on influential boundaries, decreasing with distance to the trajectory), finally normalize the probability of the influential groups such that their sum is one. This way, prob$_i$(x, y) denotes the likelihood of location (x, y) belonging to $G_i$. prob$_i$(x, y) ranges from 0 to 1. It has a value of one when (x, y) is only in the influential regions of $G_i$'s trajectories. A representation of cluster map of scene activities, e.g., FIG. 7C representing the cluster map related to FIG. 7B, can be obtained, if a distinction between groups with a different non-zero label value and assign the label value of the group with the maximum cluster probability for each location in the scene while 0 is assigned to locations that are not in any influential regions of groups.

prob_hourly$_i$ (h, x, y): group $G_i$'s occurrence probability at location (x, y) over daily 24 hours. For each location, a histogram of 24 bins with each bin corresponding to an hour period can be set. For example, the first bin keeps the record about how many trajectories in group $G_i$ impact the location (x, y) from 12:00 PM to 1:00 AM in the training data set. Here, impact means location (x, y) is within the influential region of the trajectory under consideration. The histogram is normalized to make its sum to one over the 24 bins, and thus the value of a bin representing the occurrence probability in the corresponding period of hour.

Figure 7D:
Figure 7E:

Semantic features can be also derived from a cluster of trajectories if these trajectories have one coherent moving direction within the influential region of the cluster, and the these feature may include an entry zone which is the starting part of the cluster's influential region, an exit zone which is the ending part of the cluster's influence region, a representative trajectory which is defined as the one among the cluster's constituent trajectories which has the minimum average distance to any of the others in terms of distance measure 3. FIG. 7D plots an example of an entry zone by a black rectangle and an exit zone by a green rectangle for a cluster. Further analysis can be conducted on each representative trajectory to find its pivotal points. A pivotal point is a location on the trajectory where there is a large direction change. Also, with clusters' representatives in the scene, their intersection points can be obtained. Consequently, a representative trajectory can be simplified and thus modeled as a sequence of pivotal points and intersection points along its moving direction. FIG. 7E plots representative trajectories for all resulted clusters in FIG. 7B, each having pivotal and intersection points indicated by small rectangles. A color-coded trajectory in FIG. 7E is the representative of a cluster coded by the same color in FIG. 7B.

With the above statistical features, a new trajectory appearing in the scene can be classified into a cluster (a normal scene activity) or not belonging to any cluster (an abnormal scene activity) from a viewpoint of the training dataset. For a trajectory T, a similarity score is calculated about to what degree it belongs to each of the learnt clusters by taking into consideration the statistical features, and then the maximum score is adopted as its best score. If this best score is less than a preset threshold, the trajectory is considered not belonging to any learnt cluster. Otherwise, it is a normal activity and it belongs to the cluster that has the largest score.

A similarity score is calculated by a weighted sum of the individual scores resulted from the trajectory's primitives, such as object width, object height, moving speed, moving direction, spatial location, occurrence time over all locations on the trajectory against the learnt clusters' statistics:

$$score_i = w_1 \times score\_width_i + w_2 \times score\_height_i + w_3 \times score\_speed_i +$$
$$w_4 \times score\_dir_i + w_5 \times score\_prob_i + w_6 \times score\_prob\_hourly_i$$

where $w_i$ is the weight of a feature, and they control the impact of the related feature in the final score. Single-feature based scores are computed as follows:

$$score\_width_i = \frac{1}{\|T\|} \sum_{(x,y) \in T} e^{-(width(x,y) - avg\_width_i(x,y))^2 / (2 \times std\_width_i(x,y)^2)}$$

$$score\_height_i = \frac{1}{\|T\|} \sum_{(x,y) \in T} e^{-(height(x,y) - avg\_height_i(x,y))^2 / (2 \times std\_height_i(x,y)^2)}$$

$$score\_speed_i = \frac{1}{\|T\|} \sum_{(x,y) \in T} e^{-(speed(x,y) - avg\_speed_i(x,y))^2 / (2 \times std\_speed_i(x,y)^2)}$$

$$score\_dir_i = \frac{1}{\|T\|} \sum_{(x,y) \in T} prob\_dir_i(dir(T, x, y), x, y)$$

$$score\_prob_i = \frac{1}{\|T\|} \sum_{(x,y) \in T} prob_i(x, y)$$

$$score\_hourly_i = \frac{1}{\|T\|} \sum_{(x,y) \in T} prob\_hourly_i(h(T, x, y), x, y)$$

In the above, a similarity is obtained for each location (x,y) on trajectory T and then are summed and averaged by $\|T\|$. $\|T\|$ denotes the cardinality of T, as is the number of locations of T involved in the summation calculation. For features such as object width, object height, and moving speed, a Gaussian function is used to calculate the similarity to group $G_i$ at a location (x, y) on T. The similarity of direction at (x, y) is $G_i$'s direction probability for the matched direction dir(T, x, y). The similarity of occurrence time at (x, y) is $G_i$'s occurrence probability at T's occurring hour h(T, x, y) at location (x, y).

By purposely adjusting the values of weights, different results can be achieved. For example, if $w_4$ is set to one and the others are 0, an object moving in a wrong direction even within an influential region of a cluster will be detected as abnormal activity. On the other hand, if $w_5$ is set to one and the others are 0, an object moving in a wrong direction within an influential region of a cluster will be considered as normal activity. Therefore, options can be left to human operators for them to detect abnormal activities of interest.

Figure 7F:

An example of normal scene activity and abnormal activity is presented in FIG. 7F, where the pedestrian crossing the road is detected as abnormal activity (represented in red color) while the car is classified as a normal activity (its trajectory is in green color).

If a new trajectory is classified into a cluster, it can be further annotated by using the semantic features of the belonged cluster, to generate additional information about the trajectory's status, e.g., time instants when it enters the cluster, passes pivotal points and crossing points, and leaves the cluster. Accordingly, its relative moving directions can be generated, such as turn left, turn right, etc. Moreover, the annotated trajectories can be stored in much efficient manner than saving the all original (normal) trajectories and reduce storage space.

For activity summarization, a dataset of trajectories are assumed available. When the proposed method is applied to a real-time application, the training data set can be collected during a certain period of time (e.g., 1 day, a couple of days, 1 week, a couple of weeks, or months) to get enough trajectories. Once the initial training data is obtained, the above method can be used to learn the clusters of scene activities, and extract statistical features and semantic features. These features can be used for real-time analysis of new object trajectories. Another online learning scheme is required to update existing clusters and their derived features so that the scene activity analysis system can keep reflecting the nature of normal scene activities. This can be achieved by three extra processes: replace the oldest constituent trajectory of the belonged cluster of a new normal trajectory which is controlled by a replacement probability depending on the new trajectory's primitives such as occurring time, spatial location, etc; remove an obsolete cluster if it has not been updated for a preset time (i.e., no new trajectory is classified as this cluster for a preset time); create new clusters if abnormal trajectories occur frequently and constantly over a preset time period, then apply the above clustering process to the abnormal trajectories that occurred in the past time of preset period and form new clusters if possible. Every time a cluster is updated, an old cluster is removed, or a new cluster is created, related features are updated correspondingly, and the future scene analysis is based on the updated features consequently.

Figure 8:
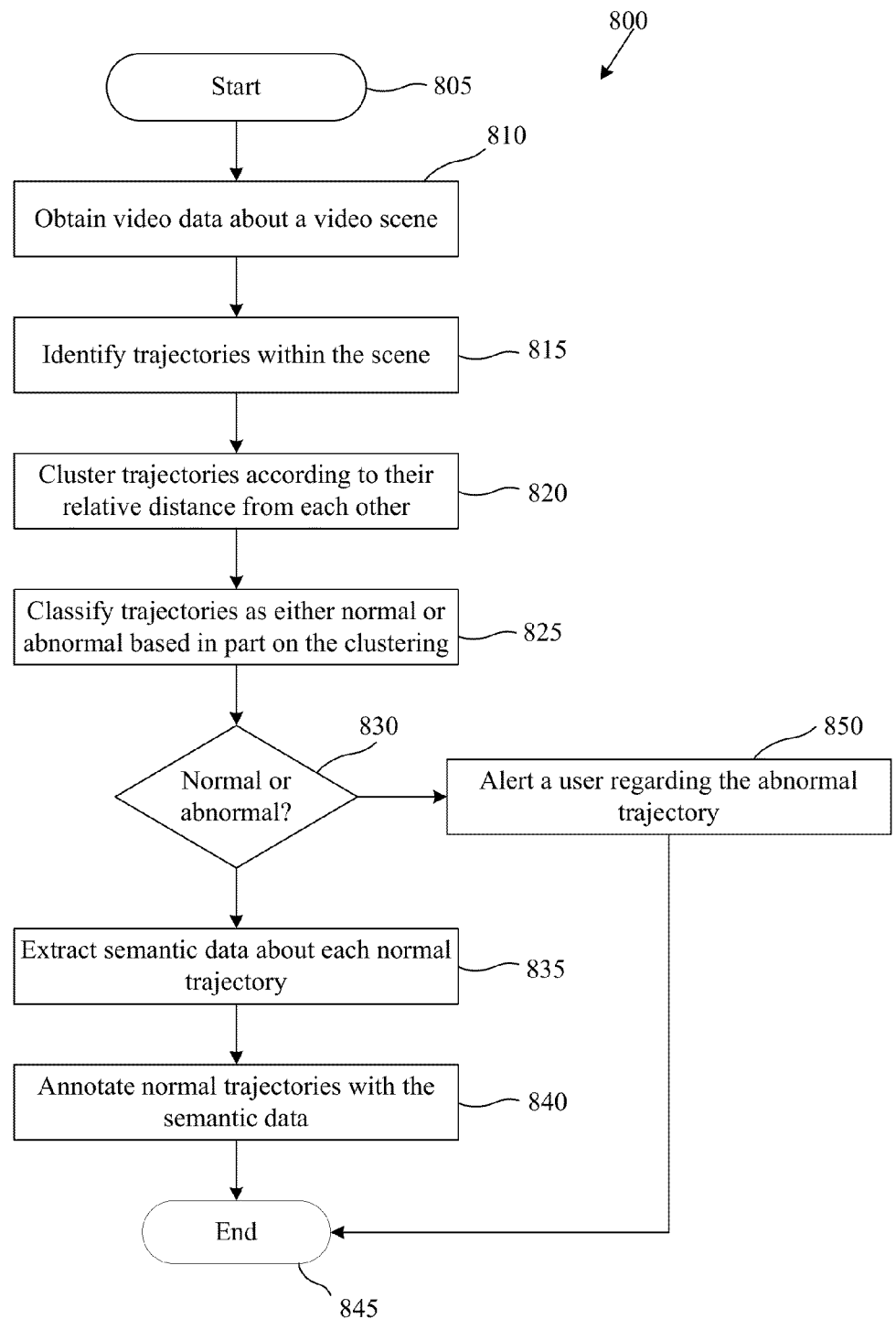
FIG. 8 is a flowchart of an activity summarization process.

Referring to FIG. 8, process 800 for analyzing trajectories and alerting a user in the event an abnormal trajectory is identified includes the blocks shown. Process 800 is an example only and is not limiting; it can be altered, e.g., by having blocks added, removed, rearranged, combined, and/or performed concurrently. Process 800 begins at block 805. At block 810, process 800 video data about a scene of interest is obtained. In some embodiments, the video data can be obtained from a database that contains the video data. In some embodiments, the video can be obtained directly from a video camera or video acquisition system. Moreover the video data can be obtained in real time as the video data is acquired. Video data can also include metadata. The metadata can include data about objects viewed within a video scene and/or events that occur within the video scene.

At block 815 trajectories can be identified. In some embodiments, trajectories can be identified by searching the metadata. In other embodiments, trajectories can be found by searching the video data for objects that move through the scene over time. Various techniques can be used for identifying trajectories. At block 820 trajectories can be clustered according to their relative distance from each other. Various techniques can be used for clustering. And many such techniques are described herein, for example, clustering based on similarities between statistical features between trajectories and/or clustering between similarities between trajectory positions. From the clustering, the trajectories can be identified as either normal or abnormal at block 825. Similarly, any number of techniques can be used to identify trajectories as normal or abnormal as described herein. An abnormal trajectory is a trajectory that is unassociated with a group of trajectories or a cluster of trajectories.

If a trajectory is identified as normal, at block 830, then process 800 proceeds to block 835 where semantic data is extracted from the trajectory or video data (including the metadata). At block 840 normal trajectories can then be annotated with the semantic data. Process 800 can then end at block 845. If, however, a trajectory is identified as an abnormal trajectory at block 830, then a user can be alerted at block 850. Process 800 ends at block 845. A user can be alerted in a number of ways. For example, a signal can be sent to a user interface or an alarm can be sounded. The video data that includes the abnormal trajectory can be flagged or labeled as having an abnormal trajectory.

Figure 9:
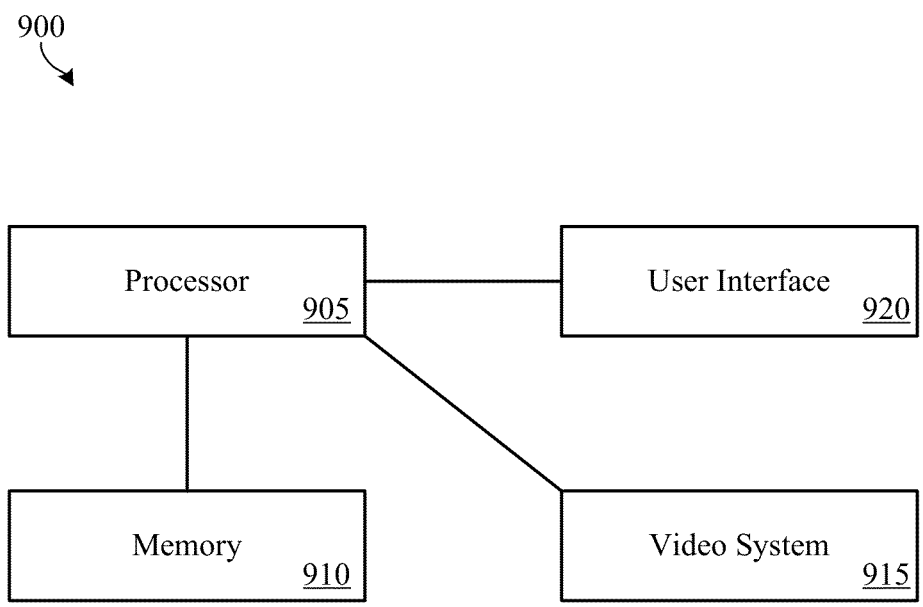
FIG. 9 is a functional block diagram of a processing unit.

Referring to FIG. 9, computer system 900 includes a processor 905, memory 910, user interface 920, and video capture or input system 915 (herein referred to as video system 915). Processor 905 is a programmable device, e.g., a central processing unit (CPU), such as those made by Intel® Corporation or AMD®, a microcontroller, an application specific integrated circuit (ASIC), a field-programmable gate array (FPGA), etc. Processor 905 processes information received from video system 915 and performs functions associated with the computer system 900 such as, for example, guidance, navigation and control functions. Memory 910 includes random access memory (RAM), read-only memory (ROM), and/or a hard drive. Memory 910 stores a non-transitory computer program product comprising processor-readable, processor-executable software code containing instructions that are configured to, when executed, cause the processor 905 to perform various functions or processes described herein (e.g., any of process 100, 200, 400, 500, 600, and/or 800). Alternatively, the software may not be directly executable by processor 905 but configured to cause processor 905, e.g., when the instructions are compiled and executed, to perform any of the functions described. User interface 920 can include a display and input devices such as a mouse and a keyboard. Moreover, user interface can be used by a user to enter various parameters (e.g., the parameters discussed in relation to block 615 and 635 shown in FIG. 6) and/or data input from user 230 shown in FIG. 2.

Other examples of configuration (including implementations) are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). A wireless communication network does not have all communications transmitted wirelessly, but is configured to have at least some communications transmitted wirelessly.

Further, more than one invention may be disclosed.

What is claimed is:

1. A method for providing trajectory information about a video scene, the method comprising:
   obtaining video scene metadata that includes information regarding trajectories for a plurality of objects moving through the video scene;
   normalizing each of the trajectories into a unified length;
   clustering each of the plurality of the normalized trajectories into trajectory groups according to relative distances from each other;
   extracting statistical features about each trajectory group;
   classifying each trajectory in the plurality of trajectories as a normal trajectory or an abnormal trajectory based at least in part on the clustering;
   extracting semantic data about each trajectory group or each normal trajectory; and
   annotating each trajectory with the semantic data;
   wherein the clustering comprises a plurality of clustering iterations using a plurality of different distance measures, wherein the plurality of different distance measures determine at least two different distance metrics using different mathematical models.

2. The method of claim 1 wherein normalizing trajectories into a unified length includes each trajectory having the same number of observations.

3. The method according to claim 1, wherein the at least two different distance metrics comprise at least two distance metrics selected from the group consisting of a minimum distance between trajectories, a maximum distance between trajectories, or an average distance between trajectories.

4. The method according to claim 1, wherein the statistical features include at least two features selected from the listing consisting of: average and standard deviation of object height, object width, object size, object speed, object appearance color, object shape, trajectory length, trajectory duration, as well as moving direction probability, spatial occurrence probability, or temporal occurrence probability.

5. The method according to claim 1, wherein the semantic data includes data selected from the group consisting of entry zones, exit zones, representative trajectories, pivotal points and directions of trajectory patterns, or crossing zones between different trajectory patterns.

6. The method according to claim 1, in the event a trajectory is classified as a normal trajectory further comprising annotating a normal trajectory based on the trajectories association with a classified group of trajectories.

7. The method according to claim 1, wherein a normal trajectory is a normalized trajectory with statistical features similar to other trajectories within a group.

8. The method according to claim 1, wherein an abnormal trajectory is a normalized trajectory that is unassociated with a group of trajectories.

9. A computer program product residing on a non-transitory processor-readable medium and comprising instructions configured to cause a processor to:
   normalize each of a plurality of trajectories into a unified length;
   cluster each of the plurality of normalized trajectories into trajectory groups according to their relative distance from each other;
   extract statistical features about each trajectory group;
   classify each trajectory in the plurality of trajectories as a normal trajectory or an abnormal trajectory based at least in part on the clustering;
   extract semantic data from each trajectory group or each normal trajectory; and
   annotate each normal trajectory with the semantic data;
   wherein the instructions to cause the processor to cluster each of plurality of trajectories into trajectory groups comprise instructions configured to cause the processor to iteratively cluster the plurality of trajectories using different distance measures, wherein the plurality of different distance measures determine at least two different distance metrics according to different mathematical models.

10. The computer program product of claim 9, further comprising instructions configured to cause the processor to annotate a normal trajectory based on the trajectories association with a classified group of trajectories.

11. A trajectory analysis system comprising:
an input configured to receive video scene metadata that includes information regarding trajectories of objects as the objects move within a video scene:
a memory; and
a processing unit communicatively coupled to the input and the memory and configured to:
normalize each of the trajectories into a unified length;
cluster each normalized trajectory into a trajectory group according to the trajectory's relative distance from previously analyzed trajectories by iteratively clustering the plurality of trajectories using different distance measures, wherein the plurality of different distance measures determine at least two different distance metrics according to different mathematical models;
identify each trajectory in the plurality of trajectories as a normal trajectory or an abnormal trajectory based at least in part on the clustering; and
annotate each normal trajectory as a normal trajectory or an abnormal trajectory.

12. The trajectory analysis system according to claim 11 wherein the processing unit is configured to extract statistical features for each trajectory group, extract semantic data from each trajectory group or each normal trajectory and annotate the normal trajectory with the semantic data.

13. The trajectory analysis system according to claim 11 further comprises a user interface wherein the processing unit is configured to notify the user through the user interface in the event a trajectory is an abnormal trajectory.

14. The trajectory analysis system according to claim 11, wherein the trajectory analysis system comprises a camera.

15. A method for determining abnormal behavior in a video scene, the method comprising:
obtaining video scene metadata that includes trajectories for a plurality of objects moving through the video scene;
statistically normalizing each trajectory to a unified length;
creating a database of normal trajectories that have been statistically normalized, from video data of a scene that includes a plurality of objects moving through the scene along a trajectory, wherein a normal trajectory comprises a trajectory that is clustered with a plurality of previous trajectories within the video scene based on a plurality of different distance measures, wherein the plurality of different distance measures determine at least two different distance metrics using different mathematical models;
identifying a new trajectory within the video scene;
statistically normalizing the new trajectory into a unified length;
determining whether the new trajectory is a normal trajectory;
in the event the new trajectory is not a normal trajectory, notifying a user; and
in the event the trajectory is a normal trajectory, annotating the trajectory with semantic data associated with the new statistically normalized trajectory.

16. The method according to claim 15, wherein the normal trajectory comprises a trajectory that is clustered with the plurality of previous trajectories within the video scene in terms of statistical feature similarities.

17. The method according to claim 15, wherein the creating a database of normal trajectories comprises:
clustering each of the plurality of statistically normalized trajectories into trajectory groups according to their relative distance from each other;
classifying each statistically normalized trajectory in the plurality of trajectories as a normal trajectory or an abnormal trajectory based at least in part on the clustering; and
saving the results of the classification in a database.

18. The method according to claim 15, wherein the determining whether the new trajectory is a normal trajectory comprises determining a relative distance in terms of statistical feature similarities between the new trajectory and one or more of the normal trajectories stored within the database.

19. A trajectory analysis system comprising:
an input configured to receive video scene metadata including one or more trajectories associated with objects that are moving within the video scene, wherein each of the one or more trajectories is a unified length;
a user interface;
a memory storing normal trajectories from video data of a scene that includes a plurality of objects moving through the scene along a trajectory, wherein a normal trajectory comprises a trajectory that is clustered with a plurality of previous trajectories within the video scene based on a plurality of different distance measures, wherein the plurality of different distance measures determine at least two different distance metrics according to different mathematical models; and
a processing unit communicatively coupled to the input and the memory and configured to:
identify a new trajectory within the video scene;
statistically normalize the trajectory into a unified length;
determine whether the new statistically normalized trajectory is a normal trajectory; and
in the event the new statistically normalized trajectory is not a normal trajectory, notify a user through the user interface; and
in the event the trajectory is a normal trajectory, annotating the trajectory with semantic data associated with the new statistically normalized trajectory.

20. The trajectory analysis system according to claim 19, wherein a new trajectory is identified as a normal trajectory when the new trajectory is near a plurality of previous trajectories.

21. The trajectory analysis system according to claim 20, wherein the processing unit is configured to determine that the new trajectory is a normal trajectory by determining that the new trajectory is near one of a plurality of trajectories based on relative distances from the new trajectory and the plurality of trajectories.

22. The trajectory analysis system according to claim 19, wherein the processing unit is configured to determine that the new trajectory is a normal trajectory when the new trajectory is similar to trajectories in a cluster of trajectories based on similarities between any of a direction, speed, or appearing time of the new trajectory and any trajectory in the cluster of trajectories.

23. The trajectory analysis system according to claim 21, wherein each of the relative distances comprises a distance measure selected from the group consisting of a minimum distance between trajectories, a maximum distance between trajectories, or an average distance between trajectories.

* * * * *